(12) United States Patent
Zielinsky

(10) Patent No.: US 8,070,207 B2
(45) Date of Patent: Dec. 6, 2011

(54) MULTI-POSITION TAILGATE SUPPORT APPARATUS AND METHOD

(76) Inventor: Cary Russell Zielinsky, Liberty, UT (US)

( * ) Notice: Subject to any disclaimer, the term of this patent is extended or adjusted under 35 U.S.C. 154(b) by 142 days.

(21) Appl. No.: 12/626,647

(22) Filed: Nov. 26, 2009

(65) Prior Publication Data

US 2011/0121601 A1    May 26, 2011

(51) Int. Cl.
E05C 17/30    (2006.01)
E05C 17/36    (2006.01)
B60J 5/10    (2006.01)
(52) U.S. Cl. ............... 296/57.1; 296/106; 16/82
(58) Field of Classification Search ............ 296/50, 296/57.1, 59, 146.8, 180.5, 106; 16/82; 24/298, 24/302
See application file for complete search history.

(56) References Cited

U.S. PATENT DOCUMENTS

| | | | | |
|---|---|---|---|---|
| 1,125,982 A * | 1/1915 | Dufala | ............. | 296/57.1 |
| 5,297,828 A * | 3/1994 | Chung | ............. | 292/258 |
| 5,913,473 A * | 6/1999 | Wang | ............. | 229/120.07 |
| 6,126,223 A * | 10/2000 | Rayburn | ............. | 296/57.1 |
| 6,648,381 B2 * | 11/2003 | Holton et al. | ............. | 292/288 |
| 7,171,731 B1 * | 2/2007 | Borcherding | ............. | 24/302 |

* cited by examiner

Primary Examiner — Glenn Dayoan
Assistant Examiner — Gregory Blankenship
(74) Attorney, Agent, or Firm — Warren M. Pate, LLC

(57) ABSTRACT

A method and apparatus for adjusting the location of suspension for a tailgate is disclosed. The method may include selecting a vehicle comprising a first side, a second side, a tailgate, and at least one tailgate support. The tailgate may be connected to pivot with respect to the first and second sides through a range of motion. The at least one tailgate support may have a first end connected to the first side, a second end connected to tailgate, and an adjustor positioned between the first and second ends. The method may further include actuating the adjustor to change the length under tension of at least one tailgate support. By changing this length, the location of suspension for the tailgate may be adjusted.

20 Claims, 19 Drawing Sheets

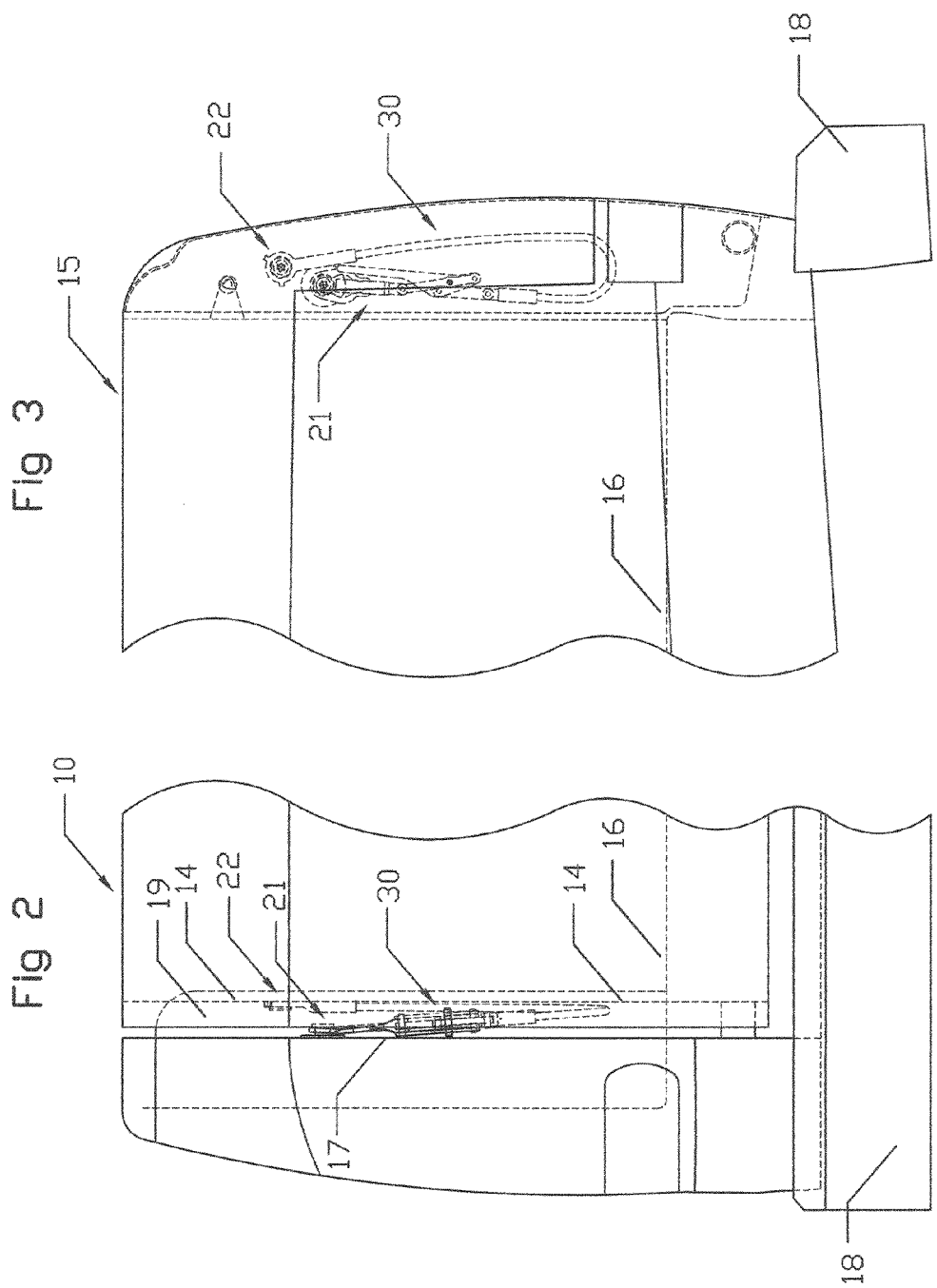

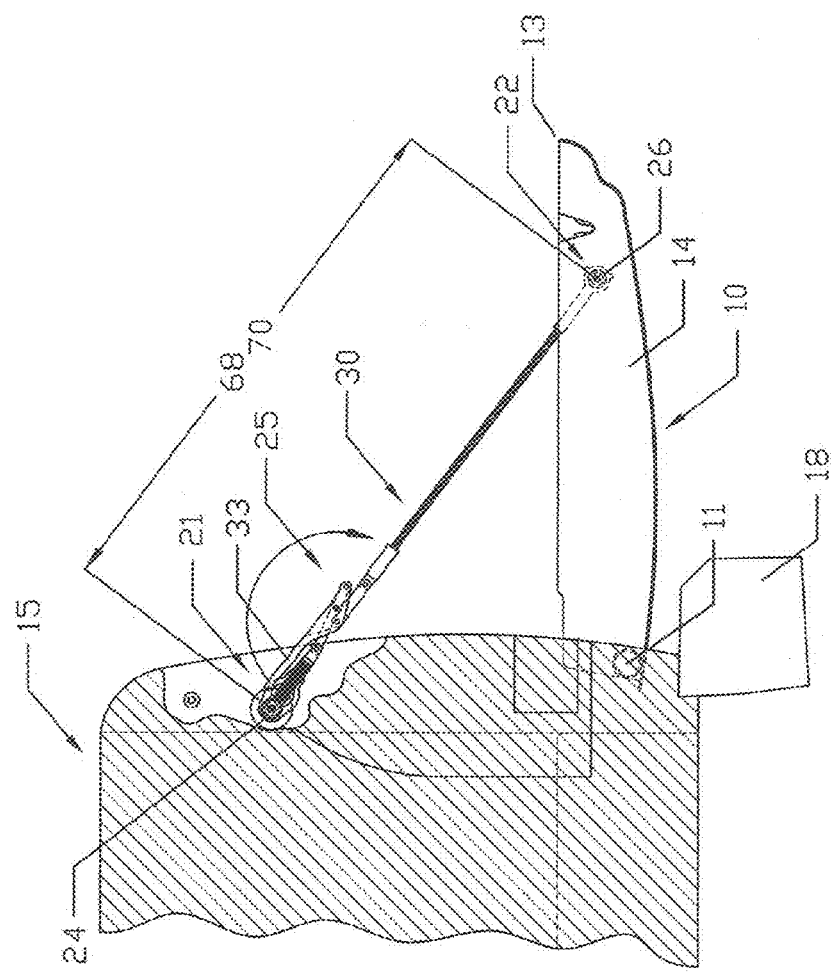

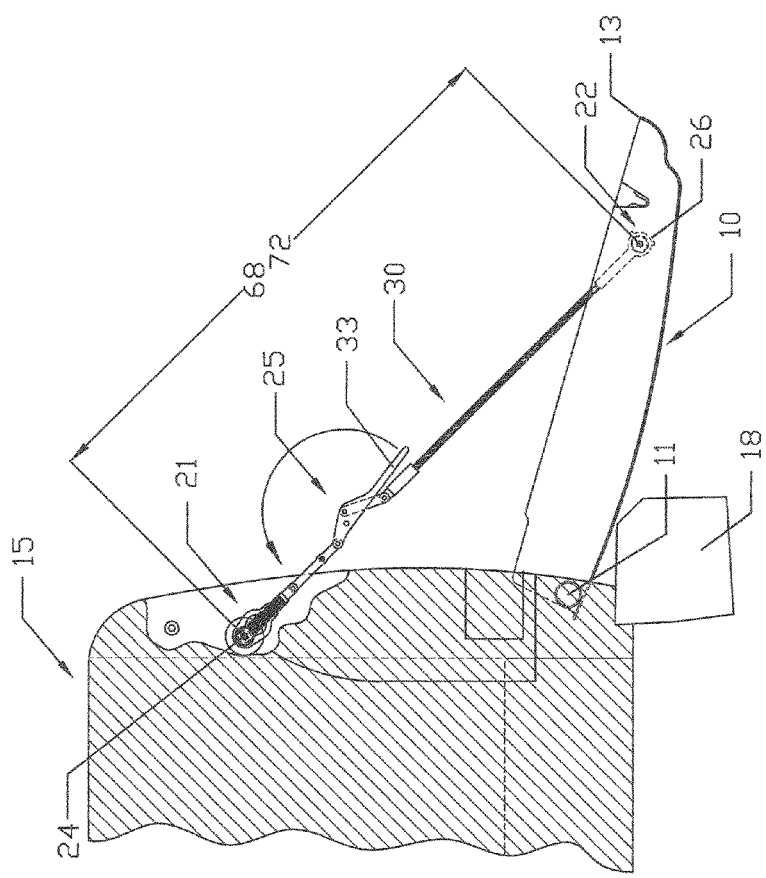

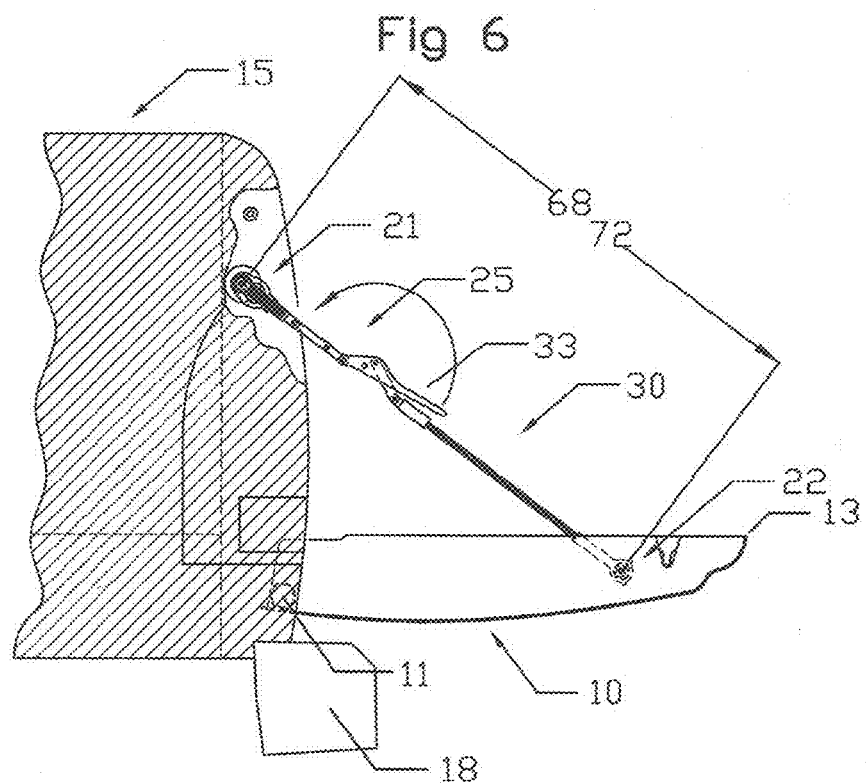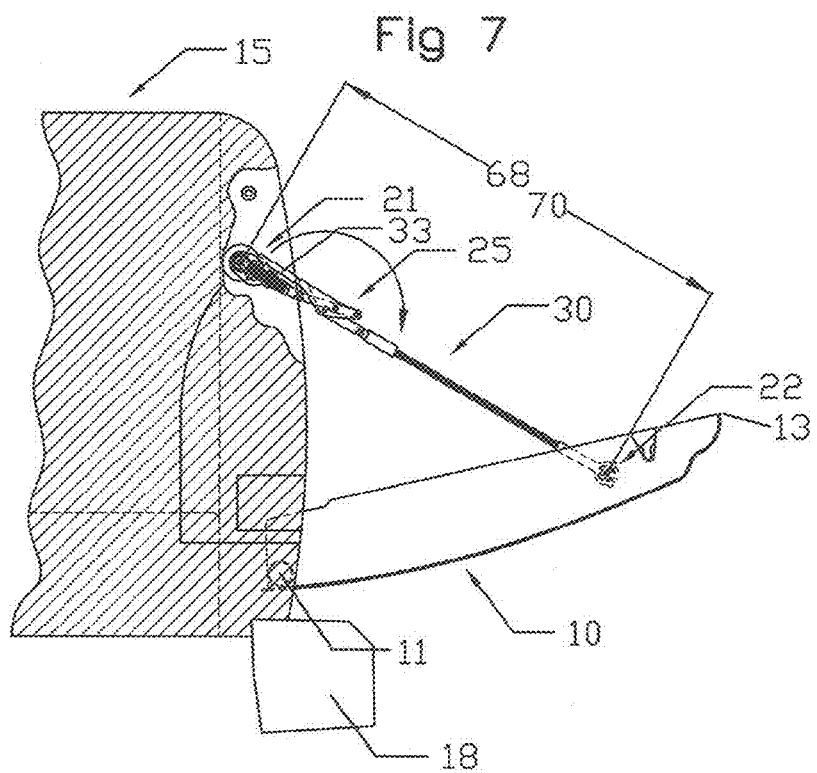

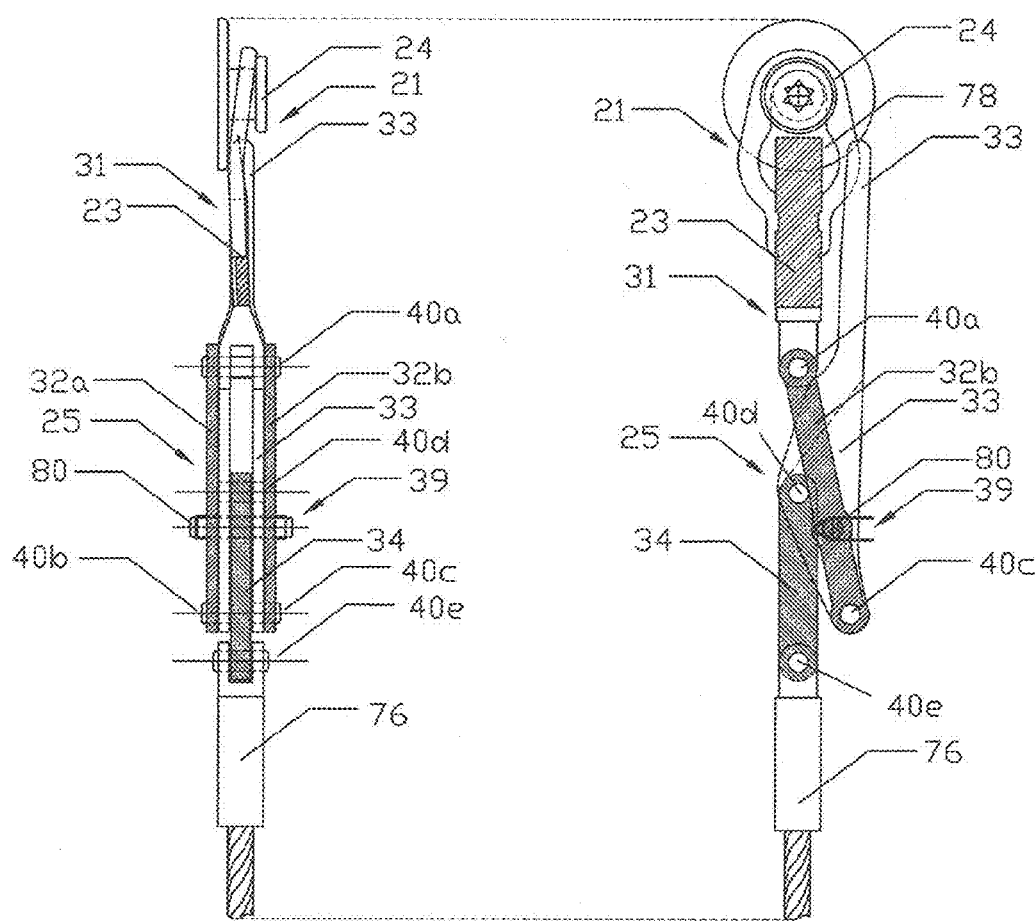

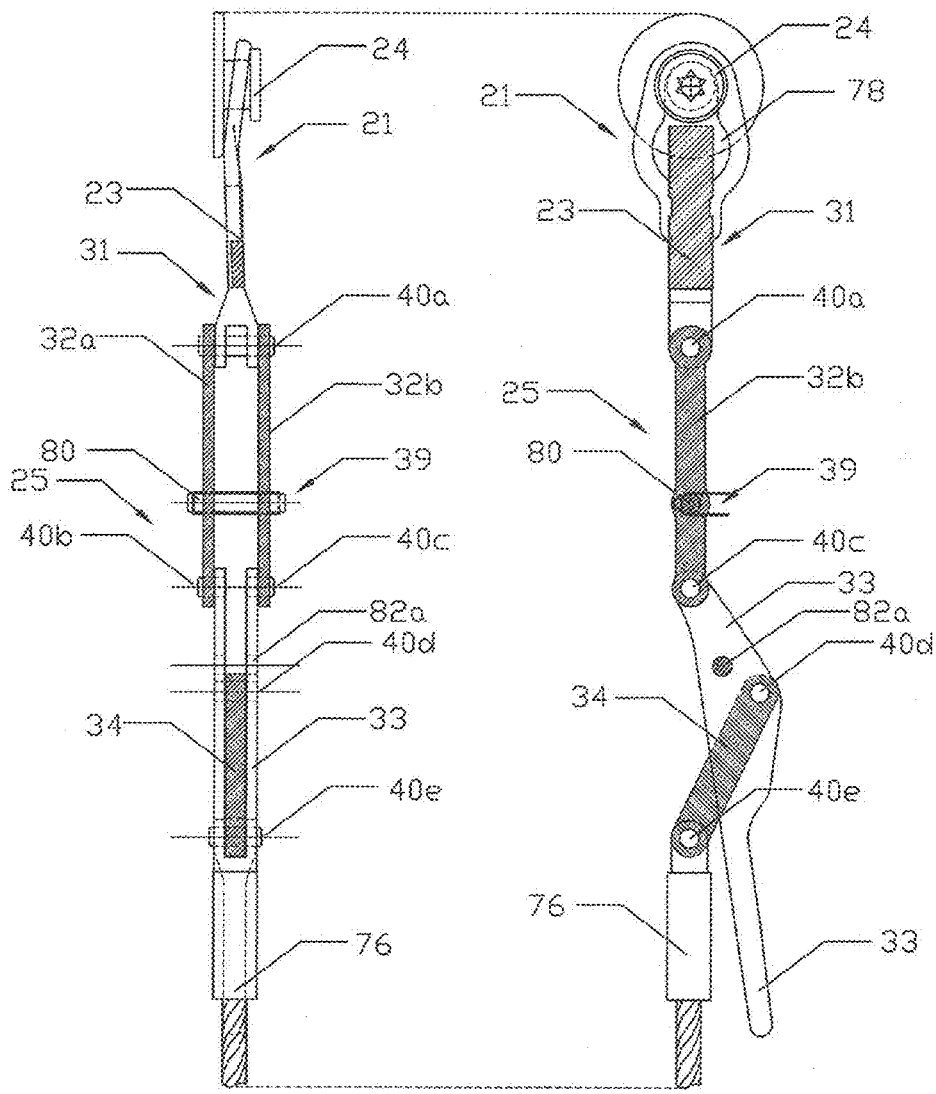

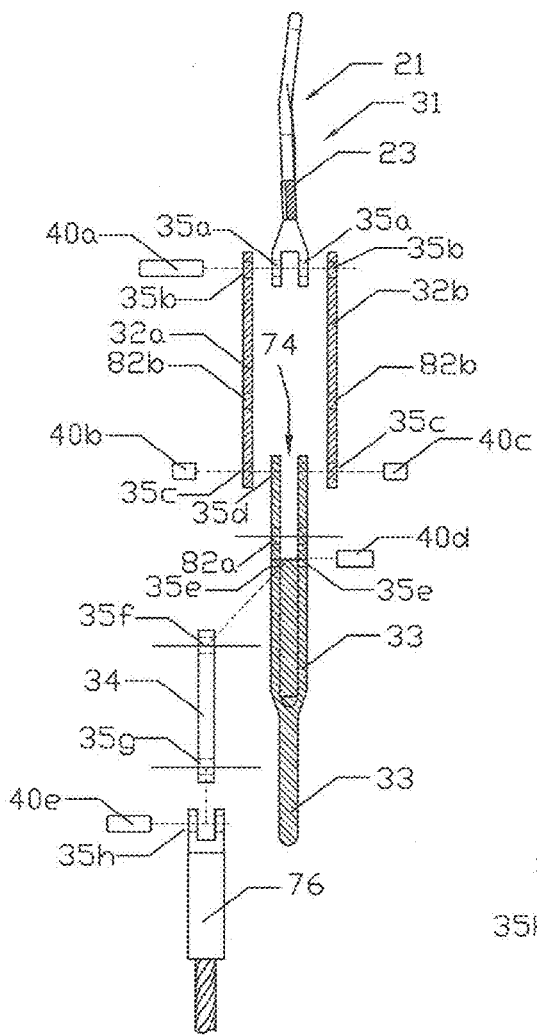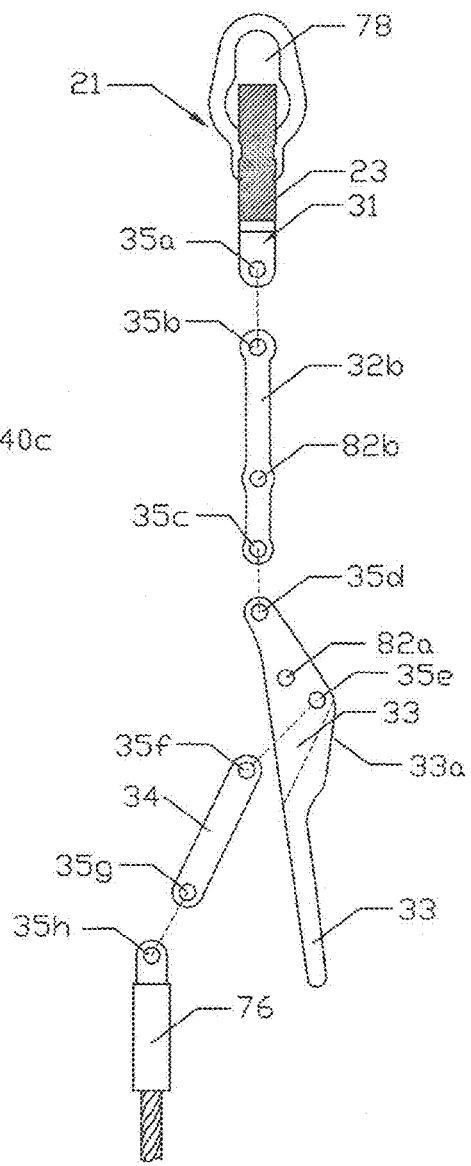

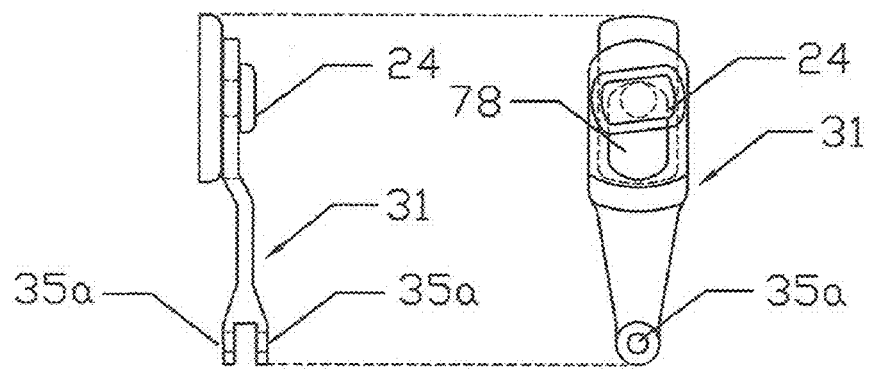

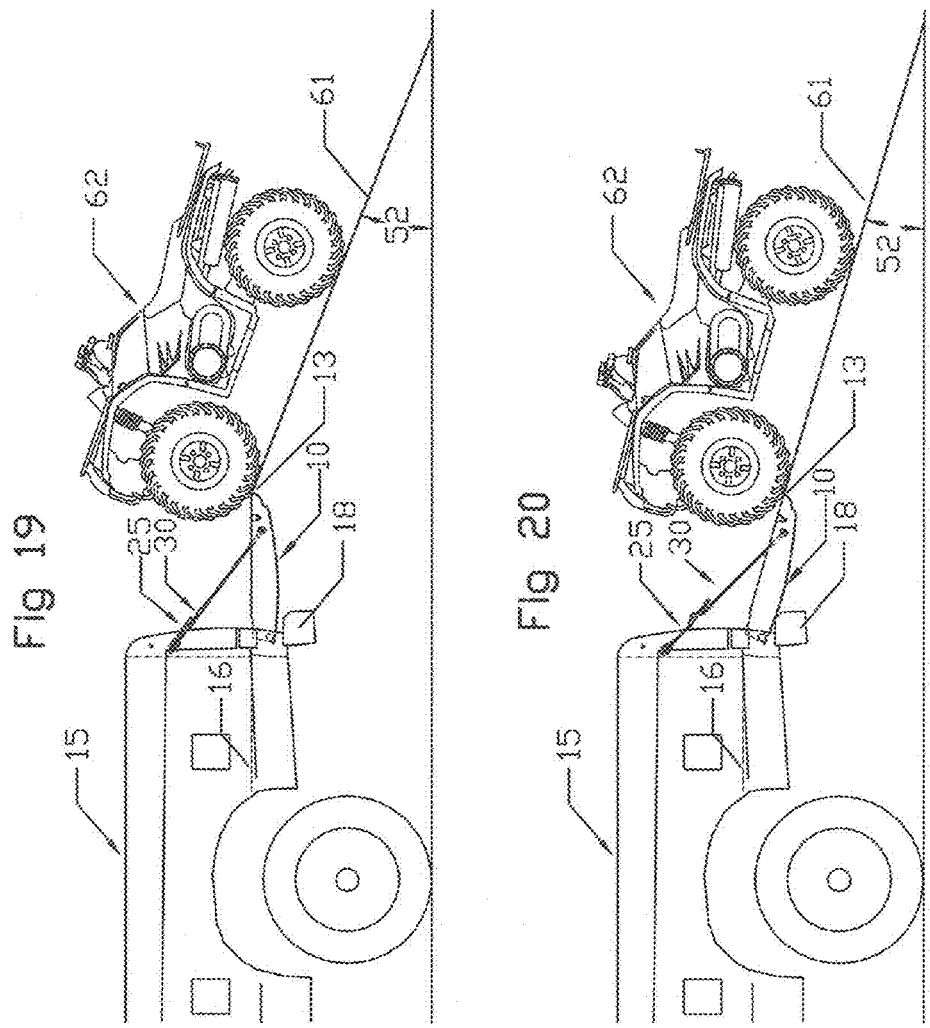

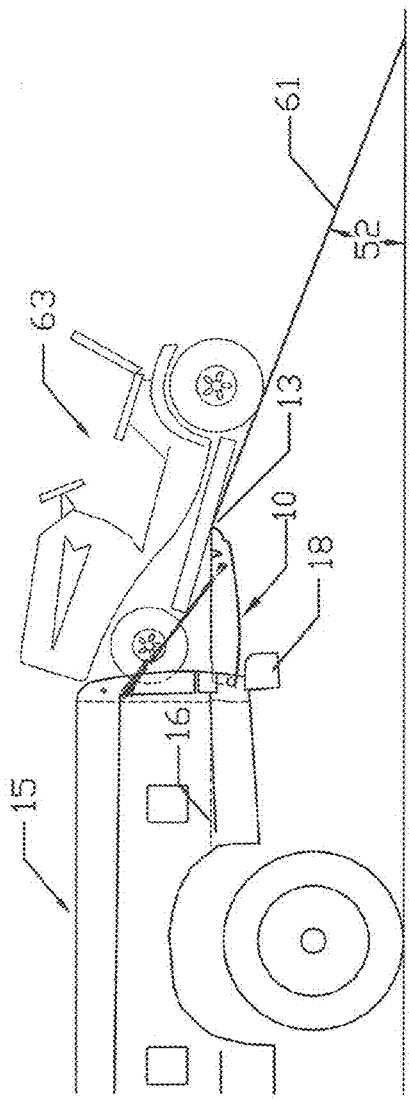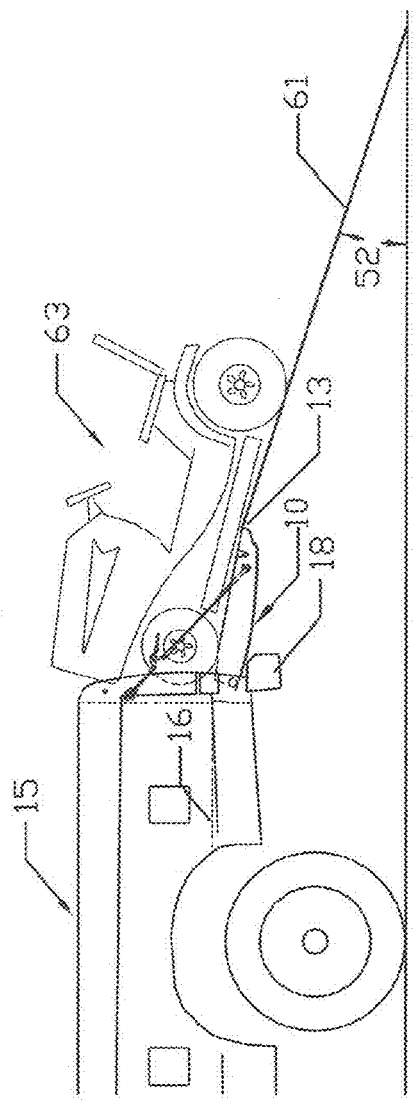

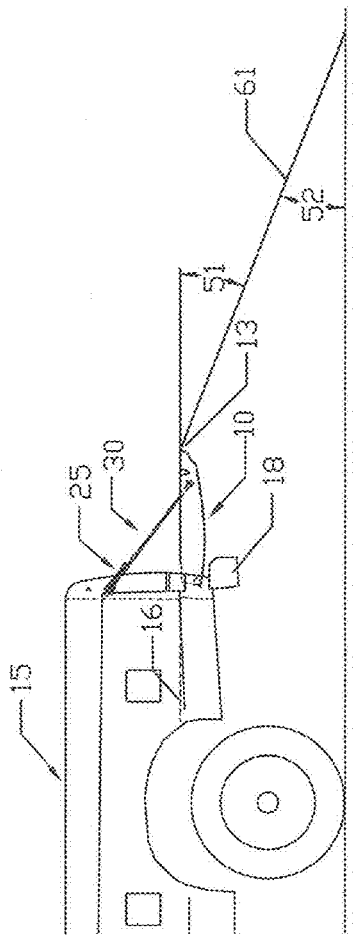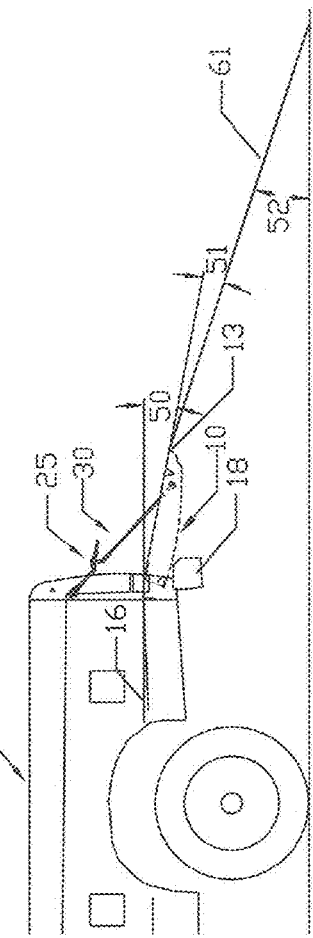

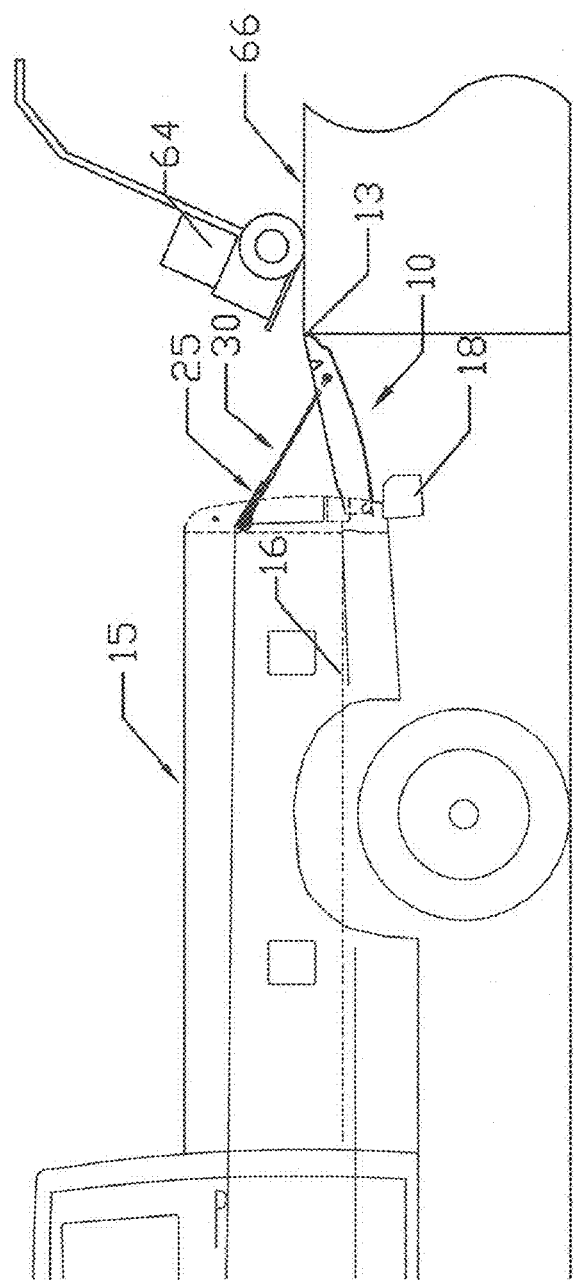

MULTI-POSITION TAILGATE SUPPORT APPARATUS AND METHOD

BACKGROUND

1. Field of Invention

This invention relates to motor vehicles and utility trailers and, more particularly, to apparatus and methods for a multi-position tailgate support facilitating suspension of a tailgate in multiple positions that each retain the tailgate's external appearance and full load-carrying capacity.

2. Prior Art

In certain situations, it may be desirable to have a low loading height on a vehicle. In the past, attempts to lower vehicle loading height have focused in two primary areas. First, attempts have been made to lower the bed height of certain vehicles. While this may work well for trailers and special purpose vehicles, it is problematic for multi-use vehicles like pickup trucks, which have certain structural limitations and clearance requirements. Second, attempts have been made to add hoists to vehicles. While hoists neutralize the need for a lower loading height by simply lifting the load for the user, they are typically large, heavy, and expensive. Thus, neither of these two areas of improvement is particularly helpful for the average pickup truck user.

Currently, many vehicles, including pickup trucks, have tailgates. However, a typical tailgate is of no assistance in raising or lowering vehicle loading height. Conventional tailgates pivot between a closed position and an open position. The open position is typically ninety degrees of rotation from the closed position. Accordingly, a typical tailgate in the open position forms an extension to the bed of the vehicle. Thus, the loading height of a vehicle with a tailgate is typically the height of the bed.

In view of the foregoing, what is needed is an inexpensive and unobtrusive apparatus and method for either raising or lowering the loading height of a vehicle like a common, everyday, pickup truck. Additionally, what is needed is a tailgate that retains its full load-bearing capacity in a partially open position, which position may provide increased retention of loads extending longer than the cargo area of the pickup truck.

SUMMARY

The present invention relates in selected embodiments to vehicles with tailgates such as, without limitation, pick-up trucks having tailgates that rotate about a horizontal pivot axis positioned proximate a lower edge of the tailgate. Certain devices in accordance with the present invention may provide an easy to install and use quick change, multi-position tailgate support. When installed, a tailgate support in accordance with the present invention may allow the tailgate to be used (e.g., loaded with weight) in multiple positions. For example, in one embodiment, the tailgate may be used in either a conventional open position or another open position that is lower or higher than the conventional open position.

In selected embodiments, tailgate supports in accordance with the present invention may allow tailgates suspended therefrom to be moved from one position to the other by simply removing a locking pin and actuating a lever located on each tailgate support. Accordingly, the location at which a tailgate is suspended may be changed without changing the external appearance or the full load-carrying capacity of the tailgate.

In certain embodiments, a tailgate support may include a first end, a second end positioned opposite the first end, and an adjustor positioned between the first and second ends. A first end of a tailgate support may comprise a quick detach fitting configured to engage a stud extending from the vehicle (e.g., from the side wall of a truck bed). A second end of a tailgate support may comprise an aperture facilitating securement (e.g., bolting) of the second end to a tailgate. An adjustor may comprise a lever. Under tension, a tailgate support may have one length when the lever is one position and a second, distinct length when the lever is in another position.

In selected embodiments, an adjustor in accordance with the present invention may include a lever comprising an adjustment mechanism providing adjustable control over the motion of the lever. For example, an adjustment mechanism may define or control one end or extreme of the range of motion of a lever. Accordingly, changes to the adjustment mechanism may produce chances in the position of a tailgate. In certain embodiments, a lever may support lowering of a tailgate below a conventional open position, while an adjustment mechanism may provide the fine tuning necessary to ensure that the tailgate in such a lower position does not inadvertently contact a bumper therebelow.

Tailgate supports may provide the variability described hereinabove, while retaining the appearance and other functionality (e.g., opening, closing, locking, etc.) of the tailgate. In selected embodiments, installation of a tailgate support may not require permanent modification of the vehicle. The changes made when installing a tailgate support may be completely and easily reversible. Accordingly, a tailgate support in accordance with the present invention may be well suited as either an O.E.M option or an aftermarket accessory.

By supporting or suspending a tailgate in an open position that is more than ninety degrees from the closed position, a tailgate support may lower the loading height of the corresponding vehicle. A lower loading height may reduce the incline angle of loading ramps commonly used to load items such as motorcycles, ATVs, small tractors, and the like. Reducing the incline of such ramps may make it easier and safer to load and unload such items. Additionally, a tailgate with a lower leading edge may support loading of items with low ground clearance (e.g., riding lawn mowers), which would normally hang on the leading edge of a conventional tailgate at the location where the ramps rest.

By supporting or suspending a tailgate in an open position that is less than ninety degrees from the closed position, a tailgate support may resist rearward movement of cargo that is longer than the cargo area of the corresponding vehicle. Additionally, a tailgate with a higher leading edge may facilitate transfer of items between a cargo area and surfaces higher than the cargo area (e.g., loading docks).

Selected embodiments in accordance with the present invention may comprise systems or packages including a new bumper or bumper relocation kit. These new bumpers or bumper relocation kits may accommodate a lower tailgate position than conventional bumpers. Such bumpers and bumper relocation kits may support greater lowering by a tailgate support in accordance with the present invention.

Additionally, tailgate supports in accordance with the present invention may be packaged or combined with paint protection padding. This padding may be applied to the tailgate, bed side surfaces of a vehicle, or combinations thereof that are adjacent a tailgate support when the tailgate is in the closed position. This padding may reduce or eliminate any adverse effects or wear caused by tailgate supports in accordance with the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 2 is a partial rear elevation view of a pickup truck having a tailgate in the closed position illustrating how a tailgate support in accordance with the present invention fits within the void between the side edge of the tailgate and the side wall of the truck bed;

FIG. 3 is a partial side elevation view of a pickup truck having a tailgate in the closed position illustrating how a tailgate support in accordance with the present invention fits within the void between the side edge of the tailgate and the side wall of the truck bed;

FIG. 4 is a side elevation view of one embodiment of a tailgate support in accordance with the present invention suspending a tailgate in the conventional open position with the adjustor in a compacted configuration;

FIG. 5 is a side elevation view of the tailgate support of FIG. 4 suspending a tailgate below the conventional open position with the adjustor in an expanded configuration;

FIG. 6 is a side elevation view of an alternative embodiment of a tailgate support in accordance with the present invention suspending a tailgate in the conventional open position with the adjustor in an expanded configuration;

FIG. 7 is a side elevation view of the tailgate support of FIG. 6 suspending a tailgate above the conventional open position with the adjustor in a compacted configuration;

FIG. 8 provides partial side elevation and front elevation views of the tailgate support of FIG. 4 having an adjustor in a compacted configuration;

FIG. 9 provides partial side elevation and front elevation views of the tailgate support of FIG. 4 having an adjustor in an expanded configuration;

FIG. 10 is an exploded side view of the adjustor of FIG. 4;

FIG. 11 is an exploded front view of the adjustor of FIG. 4;

FIG. 12 provides side elevation and front elevation views of an alternative embodiment of a first link in accordance with the present invention engaging a stud;

FIG. 19 is a schematic diagram illustrating the loading of an ATV onto a tailgate suspended, by a tailgate support in accordance with the present invention, in a conventional open position;

FIG. 20 is a schematic diagram illustrating the loading of an ATV onto a tailgate suspended, by a tailgate support in accordance with the present invention, below a conventional open position;

FIG. 21 is a schematic diagram illustrating the loading of a riding lawn mower onto a tailgate suspended, by a tailgate support in accordance with the present invention, in a conventional open position;

FIG. 22 is a schematic diagram illustrating the loading of a riding lawn mower onto a tailgate suspended, by a tailgate support in accordance with the present invention, below a conventional open position;

FIG. 23 is a schematic diagram illustrating the break-over angle of a tailgate suspended, by a tailgate support in accordance with the present invention, in a conventional open position;

FIG. 24 is a schematic diagram illustrating the break-over angle of a tailgate suspended, by a tailgate support in accordance with the present invention, below a conventional open position;

FIG. 27 is a schematic diagram illustrating a tailgate suspended, by a tailgate support in accordance with the present invention, above a conventional open position to facilitate loading the bed of a pickup truck from surfaces higher than the bed.

Figure 1:
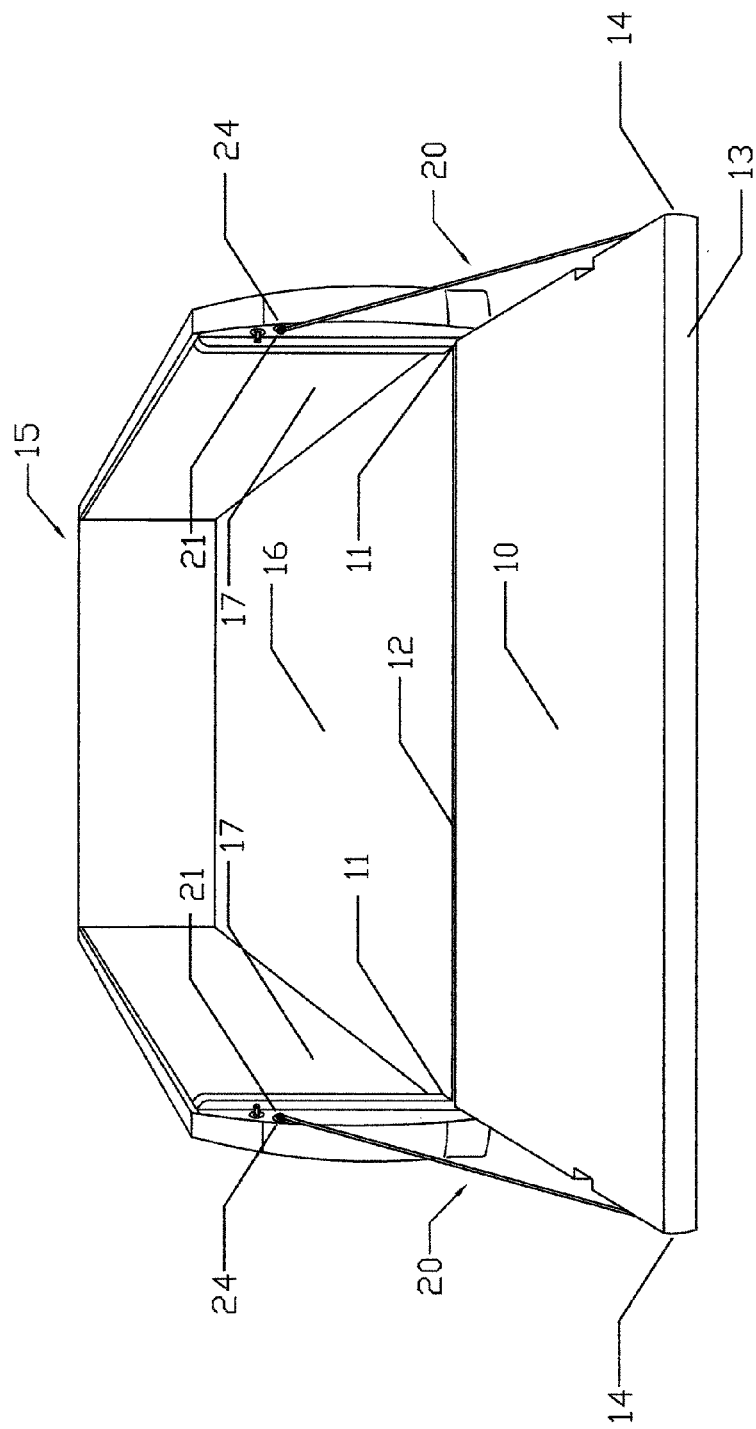
FIG. 1 is a perspective view of one embodiment of a truck bed with a tailgate in a conventional open position.
Figure 13:
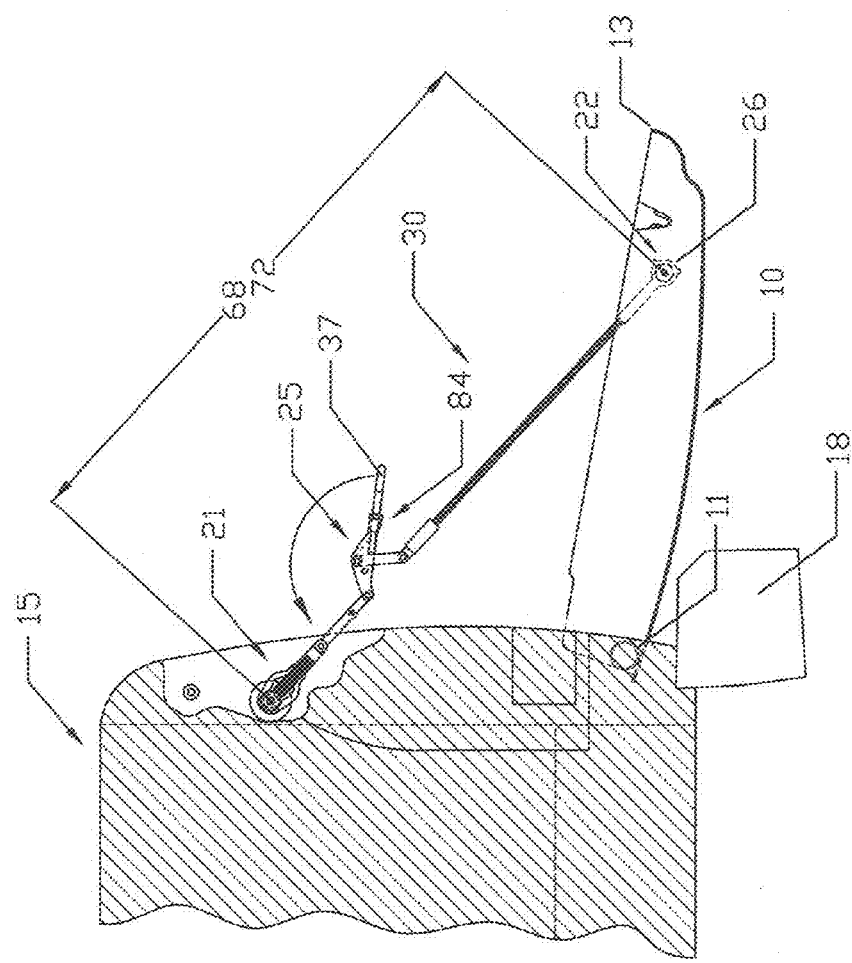
FIG. 13 is a side elevation view of an alternative embodiment of a tailgate support in accordance with the present invention suspending a tailgate below the conventional open position with the adjustor in an expanded configuration and the adjustor comprising an adjustment mechanism.
Figure 14:
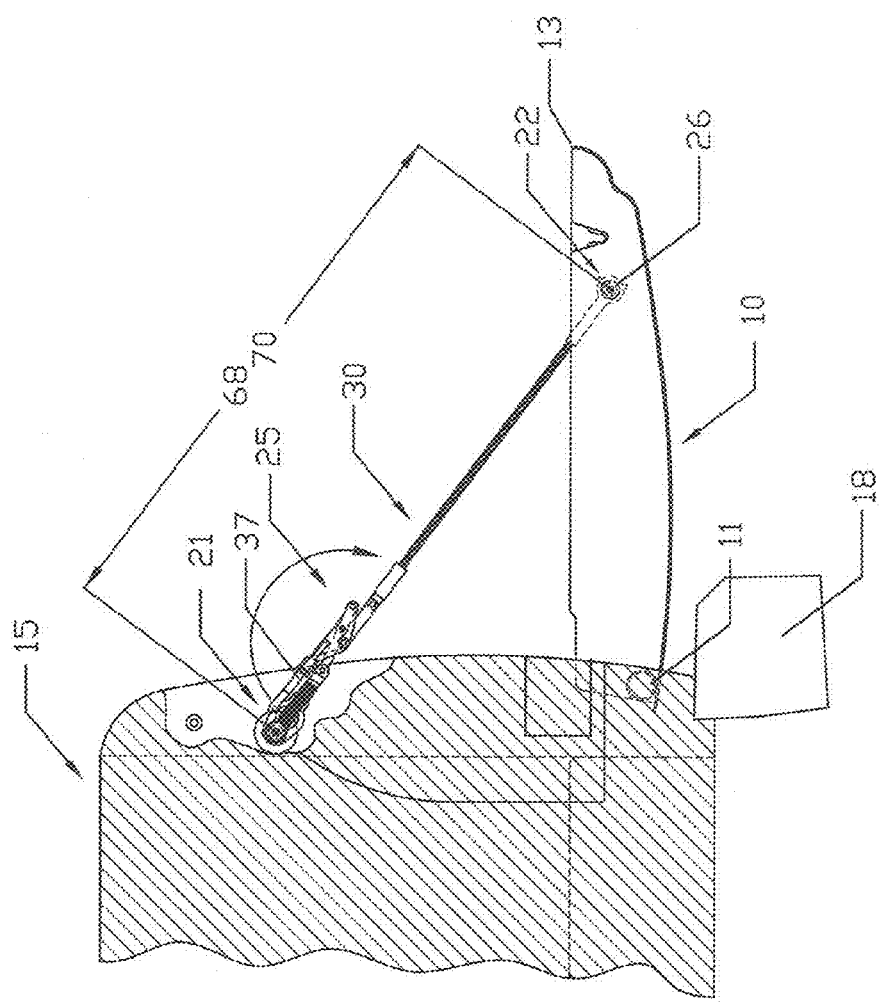
FIG. 14 is a side elevation view of the tailgate support of FIG. 13 suspending a tailgate in the conventional open position with the adjustor in a compacted configuration.
Figure 15:
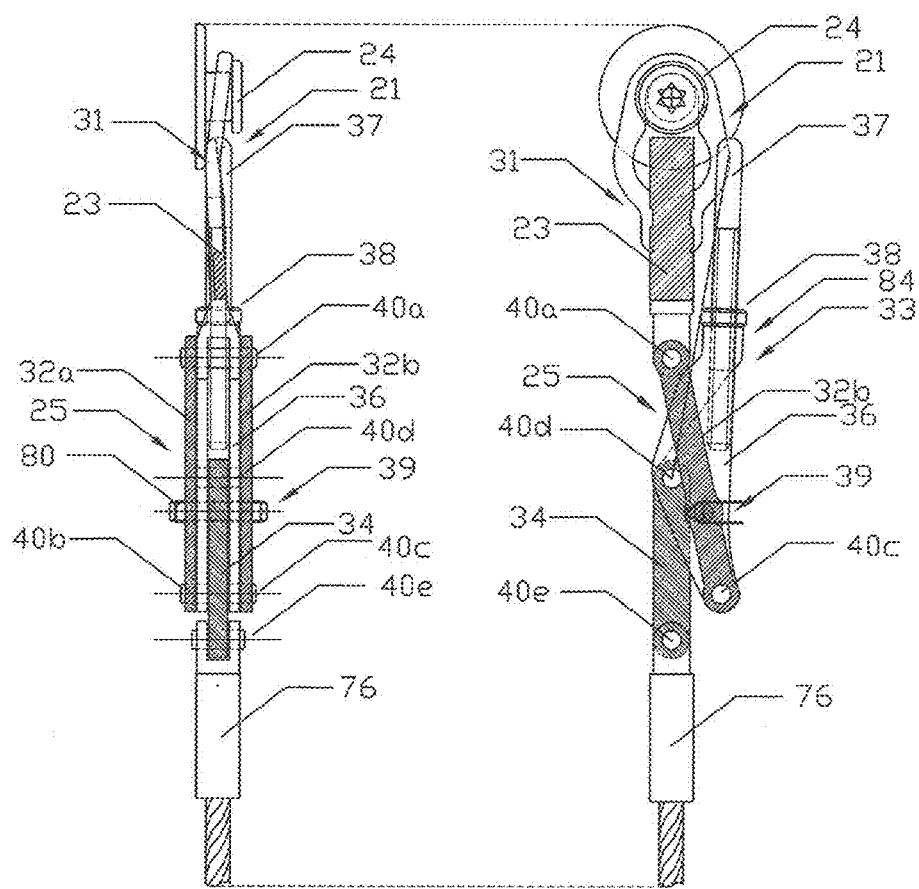
FIG. 15 provides partial side elevation and front elevation views of the tailgate support of FIG. 13 having the adjustor in a compacted configuration.
Figure 16:
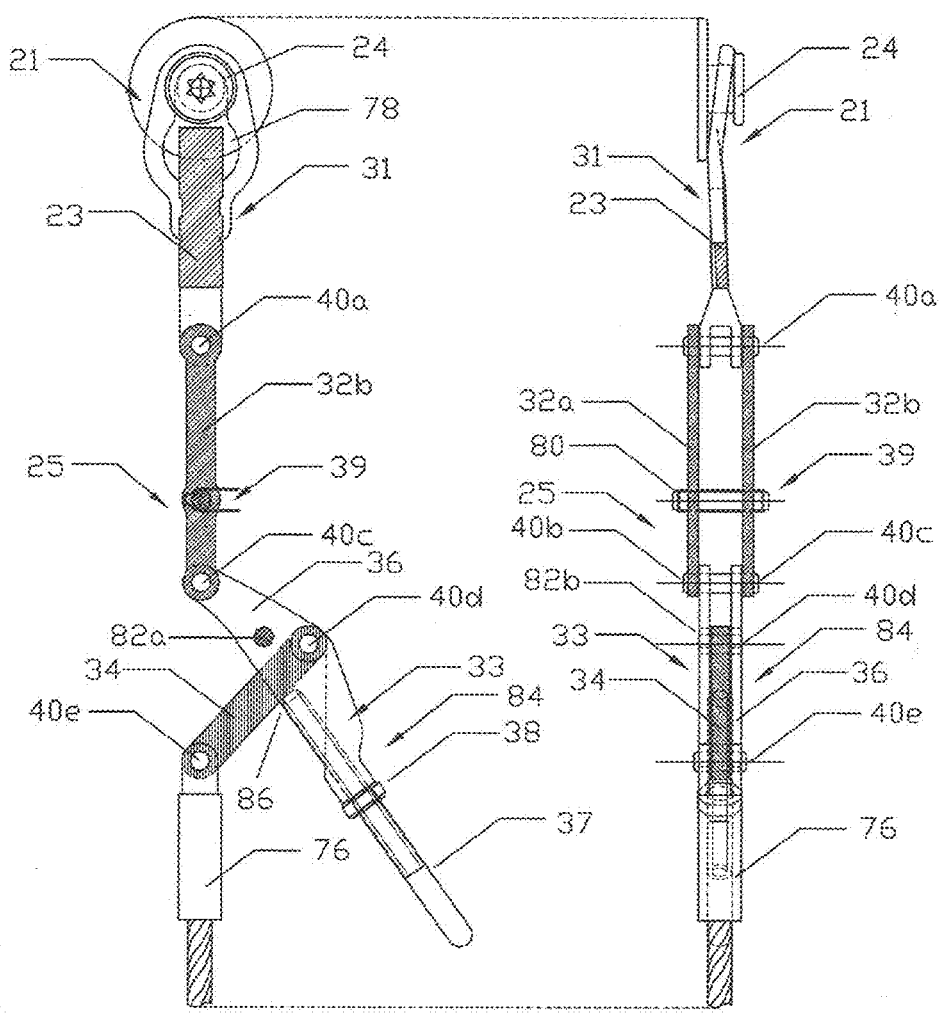
FIG. 16 provides partial side elevation and front elevation views of the tailgate support of FIG. 13 having the adjustor in an expanded configuration.
Figure 17:
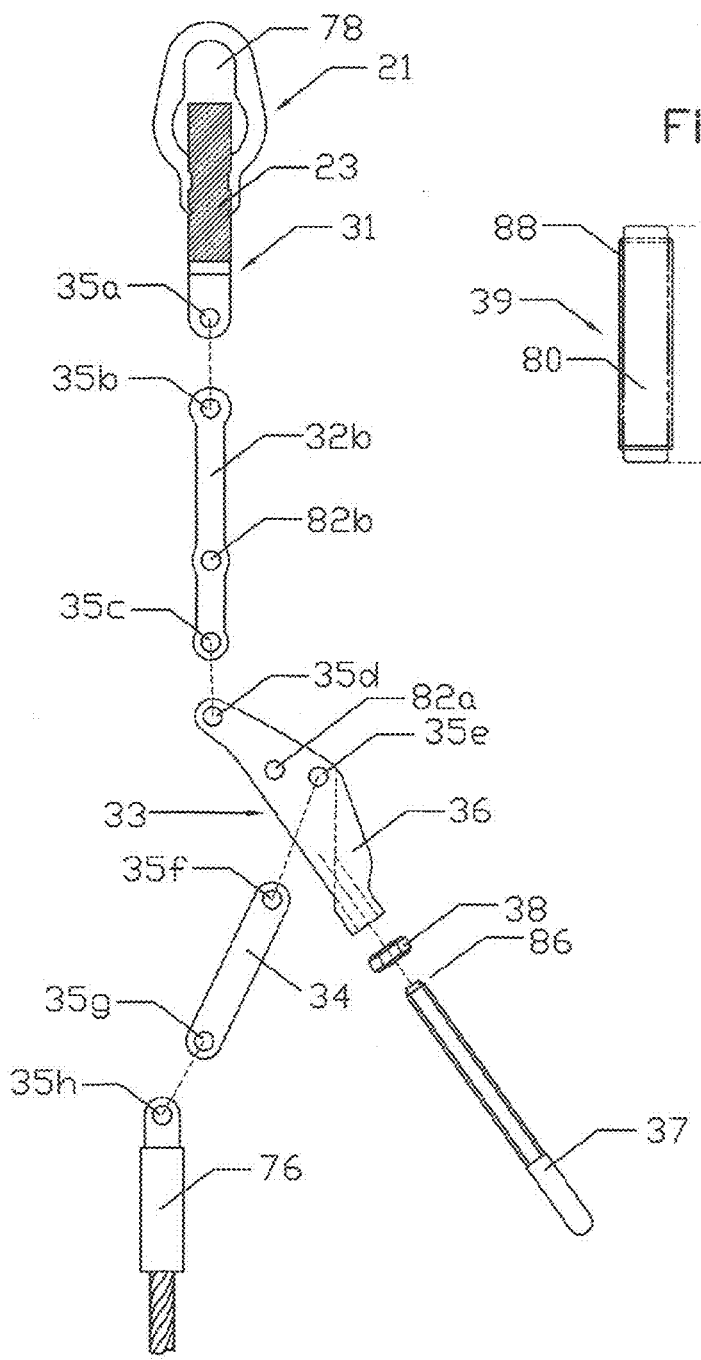
FIG. 17 is an exploded side view of the adjustor of FIG. 13.

KEY FOR REFERENCE NUMERALS
CONTAINED IN DRAWINGS

10—tailgate
11—tailgate pivot
12—pivot edge
13—leading or top edge
14—tailgate side
15—cargo area or truck bed
16—bed floor
17—bed side or side wall
18—bumper
19—void between bed side and tailgate edge when tailgate is closed
20—tailgate cable or linkage
21—first end
22—second end
23—keeper
24—stud
25—adjustor
26—bolt
30—tailgate support
31—first link
32a—second link
32b—third link
33—fourth link or lever
34—fifth link
35a—pivot aperture in first link
35b—pivot aperture in second and third links
35c—pivot aperture in second and third links
35d—pivot aperture in lever
35e—pivot aperture in lever
35f—pivot aperture in fifth link 35g—pivot aperture in fifth link
35h—pivot aperture in sixth link
36—lever body
37—adjustable lever handle
38—fastener (e.g., jam nut)
39—lever lock
40a—first pivot pin
40b—second pivot pin
40c—third pivot pin
40d—fourth pivot pin
40e—fifth pivot pin
50—tailgate decline angle
51—break over angle
52—loading ramp angle
61—loading ramp
62—all terrain vehicle (ATV)
63—riding lawn mower
64—cargo
65—motorcycle
66—loading dock
68—tensioned length
70—first value of tensioned length
72—second value of tensioned length
74—channel formed in lever
76—sixth link
78—aperture in first link for receiving stud
80—locking pin
82a—locking apertures in fourth link
82b—locking apertures in second and third links
84—adjustment mechanism
86—contact end
88—wire loop

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in selected embodiments, a cargo area 15 or bed 15 of a vehicle such as a pickup truck may include a tailgate 10, two bed sides 17 or side walls 17, two tailgate cables 20 or linkages 20, and a bed floor 16. A tailgate 10 may be pivotable about a tailgate pivot 11 and have a pivot edge 12 and a leading or top edge 13. The tailgate 10 may be supported or suspended in the open position by the tailgate cables 20 or linkages 20. One end of each tailgate cable 20 or linkage 20 may be attach to a stud 24 located on the side walls 17 or bed sides 17 of the cargo area 15. The other end of each tailgate cable 20 or linkage 20 may attach to a tailgate side 14. The tailgate 10 may be pivotable about a tailgate pivot 11 between a generally vertical closed or first position and an open or second position.

Referring to FIGS. 2 through 5, a tailgate support 30 in accordance with the present invention may be installed in the place of a tailgate cable 20 or tailgate linkage 20. This may be done as an "aftermarket" modification. For example, after purchasing a pickup truck, an owner may purchase two tailgate supports 30. The owner may then remove the two tailgate cables 20 or linkages 20 from the pickup truck and install in the place thereof the two tailgate supports 30. Alternatively, one or more tailgate supports 30 may be installed on a vehicle in an initial manufacturing process.

A tailgate support 30 may include hardware facilitating installation thereof on existing, common, or conventional tailgate systems. For example, a first end 21 of a tailgate support 30 may be sized and shaped to engage and retain a stud 24 extending from the side wall 17 of a vehicle. A second end 22 of a tailgate support 30 may be attached the tailgate side 14 by a fastener (e.g., a bolt 26). In selected embodiments, a second end 22 may include an aperture for receiving the fastener 26 therethrough.

Between the first and second ends 21, 22, a tailgate support 30 may include an adjustor 25. By actuating or manipulating an adjustor 25, a user may change the tensioned length 68 (i.e., length when tensioned) of a tailgate support 30. The tensioned length 68 of a tailgate support 30 may be achieved by pulling the first and second ends 21, 22 away from one another. Actuating or manipulating an adjustor 25 may transition the tensioned length 68 from a first value 70 to a second value 72, distinct from the first value 70. In the illustrated embodiment, this first value 70 may correspond to a tailgate 10 supported or suspended in a conventional open position, which is about ninety degrees of rotation from the closed position. The second value 72 may correspond to a tailgate 10 supported or suspended with its leading or top edge 13 lower than it is in the convention open position.

In selected embodiments, an adjustor 25 may comprise a lever 33. Moving (e.g., toggling) such a lever 33 between at least two positions may change the tensioned length 68 of a tailgate support 30 between the first and second values 70, 72. For example, a lever 33 may pivot through a range of motion. At one end of the range of motion, a lever 33 may occupy a first position, dictating a first value 70 for the tensioned length 68. At an opposite end of the range of motion, the lever 33 may occupy a second position, dictating a second value 72 for the tensioned length 68.

A tailgate support 30 in accordance with the present invention may be configured to minimize any undesirable wear on the vehicle of a user. For example, in certain embodiments, one or more surfaces of the tailgate support 30 may be coated with a rubber like material to protect the paint on a corresponding vehicle. Alternatively, tailgate supports 30 in accordance with the present invention may be packaged or combined with paint protection padding. This padding may be applied to the tailgate 10, bed side 17 surfaces of a vehicle, or combinations thereof that are adjacent a tailgate support 30 when the tailgate 10 is in the closed position. This padding may reduce or eliminate any adverse effects or wear caused by tailgate supports 30.

Referring to FIGS. 6 and 7, as disclosed hereinabove, in selected embodiments, a tensioned length 68 of a first value 70 may correspond to a tailgate 10 supported or suspended in a conventional open position, which is about ninety degrees of rotation from the closed position. In other embodiments, a tensioned length 68 of a first value 70 may correspond to a tailgate 10 supported or suspended above a conventional open position (i.e., less than ninety degrees of rotation from the closed position). In such embodiments, the second value 72 may be greater than the first value 70. Accordingly, the second value 72 may correspond to a tailgate 10 supported or suspended in a conventional open position (i.e., about ninety degrees of rotation from the closed position).

Referring to FIGS. 8 through 11, in selected embodiment, a tailgate support 30 may comprise multiple links 31, 32a, 32b, 33, 34, 76 connected together by various pivot pins 40.

For example, a first end 21 of a tailgate support 30 may be formed by a first link 31. At one end, a first link 31 may have aperture 78 and corresponding keeper 23 sized and shaped to engage and retain a stud 24 extending from the side wall 17 of a vehicle. At the other end, a first link 31 may have one or more pivot apertures 35a.

Second and third links 32a, 32b may each have multiple pivot apertures 35b, 35c, one at each end thereof. A first pin 40a may connect the first ends of the second and third links 32a, 32b to the first link 31. In selected embodiments, the second and third links 32a, 32b may bracket the first link 31. Second and third pins 40b, 40c may respectively connect the second ends of the second and third links 32a, 32b to a fourth link 33. As with the first link 31, the second and third links 32a, 32b may bracket the fourth link 33.

In certain embodiments, a fourth link 33 may comprise a lever 33 and two sets of pivot apertures 35d, 35e. One such pivot aperture 35d may receive the second pin 40b on one side thereof and the third pin 40c on the other side thereof. Another set of pivot apertures 35e may receive a fourth pin 40d. The fourth pin 40d may connect the fourth link 33 to a fifth link 34. The fourth link 33 may further include a channel 74 to receive the fifth link 34 at least partially therewithin.

A fifth link 34 may have pivot apertures 35f, 35g at both ends thereof. The fourth pin 40d may be positioned within one such aperture 35f to connect a first end of the fifth link 34 to the fourth link 33. A fifth pin 40e may be positioned within the other such aperture 35g to connect a second end of the fifth link 34 to a sixth link 76. The sixth link 76 may extend from the fifth link 34 to engage the tailgate 10. In selected embodiments, a sixth link 76 may comprise cable with a fitting press fit onto each end thereof. At one end, the fitting may have apertures 35h formed therein to receive the fifth pin 40e. At the other end, the fitting may have an aperture formed therein for receiving a fastener 26 therethrough. The fastener 26 may then connect the sixth link 76 to the tailgate 10.

In certain embodiments, an adjustor 25 in accordance with the present invention may transition between at least two configurations. One such configuration may be considered to be a contracted configuration, dictating a first value 70 for the tensioned length 68. Another such configuration may be considered to be an expanded configuration, dictating a second value 72 for the tensioned length 68. A user may transition an adjustor 25 from one such configuration to the other by actuating or manipulating the lever 33.

A lever 33 may provide a mechanical advantage, assisting a user to transition an adjustor 25 into a compacted configuration against the weight of the tailgate 10. In selected embodiments, an adjustor 25 may be configured such that, as the lever 33 transitions the adjustor 25 from the expanded configuration to the contracted configuration, the lever 33 may draw the fifth link 34 up to and between the second and third links 32a, 32b. This motion may continue until lever 33 contacts or abuts the first link 31. Thus, the lever 33 may "cam" the fourth pin 40d over and past the second and third pins 40b, 40c. As a result, once an adjustor 25 has reached the contracted configuration, tensile loads applied to the adjustor 25 may act to maintain the adjustor 25 in the contracted configuration. Accordingly, an adjustor 25 may be self locking.

To ensure that an adjustor 25 does not inadvertently exit the contracted configuration, selected embodiments of an adjustor 25 in accordance with the present invention may include a lever lock 39. A lever lock 39 may lock a lever 33 against pivoting and transitioning the adjustor 25 out of the contracted configuration. In certain embodiments, a lever lock 39 may comprise a locking pin 80 inserted into selected locking apertures 82. For example, locking apertures 82a, 82b may extend through a lever 33 and the second and third links 32a, 32b, respectively. The locking apertures 82a, 82b may be positioned such that they align when the adjustor 25 is in the contracted configuration. Accordingly, once the adjustor 25 in is the contracted configuration, the locking pin 80 may be inserted within the locking apertures 82a, 82b and prevent relative motion between the lever 33 and the second and third links 32a, 32b.

The components of a tailgate support 30 may be formed of any suitable material or combinations of materials. Suitable materials may be selected based on cost, formability, strength, durability, corrosion resistance, and the like. In selected embodiments, the components of a tailgate support 30 may be formed of metal, metal alloys, or combinations thereof.

Referring to FIG. 12, while the embodiments described hereinabove included first links 31 comprising apertures 78 and keepers 23, other first links 31 may be used or substituted in the embodiments described. Accordingly, first links 31 may be configured to fit existing, common, or conventional tailgate systems. For example, in the illustrated embodiment, a first link 31 has been configured to fit an alternative embodiment of a stud 24 extending from the vehicle (e.g., from the side wall of a truck bed). Due to the shape of this alternative stud 24, the illustrated first link 31 does not need a keeper 23.

Referring to FIGS. 13 through 17, in certain embodiments, an adjustor 25 may comprise an adjustment mechanism 84 providing increased control over the motion of a lever 33, and hence the value of the tensioned length 68 dictated thereby. In selected embodiments, an adjustment mechanism 84 may form part of a lever 33. For example, a lever 33 may comprise a lever body 36, an adjustable lever handle 37, and a fastener 38. By manipulating the fastener 38, adjustable lever handle 37, or some combination thereof, a user may control the relative position of the adjustable lever handle 37 with respect to the lever body 36. In turn, the adjustable lever handle 37 may extend to contact another component of the adjustor 25 (e.g., the fifth link 34).

Contact between the adjustable lever handle 37 and another component of the adjustor 25 may define one end of the lever's range of motion. Accordingly, changes to the relative position of the adjustable lever handle 37 with respect to the lever body 36 may fine tune the value 72 of the tensioned length 68 dictated by the adjustor 25. This fine tuning may enable a user to ensure that a tailgate 10 in a lower-than-conventional, open position does not inadvertently contact a bumper 18 therebelow. In certain embodiments, changes to the position of the adjustable lever handle 37 may not affect the position of a tailgate 10 when the adjustor 25 is in the compacted configuration.

In selected embodiments, a lever body 36 may have a threaded aperture configure to receive the adjustable lever handle 37 in a threaded engagement. In such embodiments, a fastener 38 may comprise a jam nut 38 threaded on the adjustable lever handle 37 to resist inadvertent relative motion between a adjustable lever handle 37 and a lever body 36. A contact end 86 of the adjustable lever handle 37 may extend to contact the fifth link 34 when the adjustor 25 reaches the expended configuration. As the adjustable lever handle 37 is rotated in one direction (e.g., clockwise), the range of motion of the lever 33 is shortened and the value 72 of the tensioned length 68 is decreased. Conversely, as the adjustable lever handle 37 is rotated in an opposite direction (e.g., counter clockwise), the range of motion of the lever 33 is lengthened and the value 72 of the tensioned length 68 is increased.

Once the desired value 72 for the tensioned length 68 has been achieved, the fastener 38 (e.g., jam nut) may be tightened against the lever body 36 to effectively lock the adjustable lever handle 37 in the selected positioned with respect to the lever body 36. Later, if further adjustments to the tensioned length 68 are desired, the fastener 38 may be loosened and the contact end 86 of the adjustable lever handle 37 may be advanced or retracted as desired by the user. Again, once the desired value 72 for the tensioned length 68 has been achieved, the fastener 38 may be tightened against the lever body 36. When tailgate supports 30 in accordance with the present invention are used in pairs (e.g., one on each side 14 of a tailgate 10), the contact end 86 of each adjustable lever handle 37 may be set to the same position.

Figure 18:
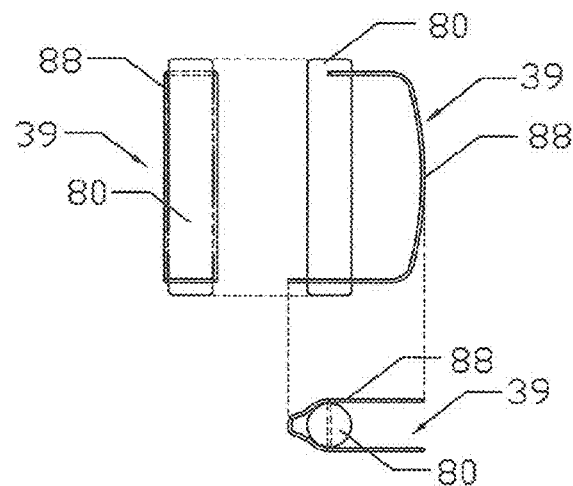
FIG. 18 provides a top plan view, a side elevation view, and an end elevation view of one embodiment of a locking pin in accordance with the present invention.

Referring to FIG. 18, a lever lock 39 in accordance with the present invention may lock an adjustor 25 in the contracted position. In selected embodiments, a lever lock 39 may comprise a pin 80 and a wire loop 88. The wire loop 88 may pivot with respect to the pin 80. Once the pin 80 has been inserted into the appropriately aligned locking apertures 82a, 82b, the wire loop 88 may be pivoted into engagement with the pin 80. Accordingly, the wire loop 88 may resist inadvertent remove of the pin 80 from the locking apertures 82a, 82b.

Referring to FIGS. 19 and 20, by allowing a tailgate 10 to open more than ninety degrees, embodiments in accordance with the present invention lower the leading or top edge 13 of the tailgate 10. This may result in a reduction in the incline of loading ramps 61 used when loading items such as motorcycles 65, ATV's 62, small tractors, or the like into the bed of a vehicle. By reducing the loading ramp angle 52 of the loading ramps 61, it may be easier and safer to load and unload such items.

Referring to FIGS. 21 through 24, a tailgate 10 with a lower leading edge 13 may facilitate loading of items with low ground clearance (e.g., riding lawn mowers 63). Such items would normally hang on the leading edge 13 of a conventional tailgate 10 at the location where the loading ramps 61 rest. However, in embodiments in accordance with the present invention, when the leading edge 13 of the tailgate 10 is lowered below the plane of the bed floor 16, both the incline of the loading ramps 61 and the break-over angle 51 are reduced.

The break-over angle 51 may be defined as the angle between the plane of the tailgate 10 extended rearward and the angle of the loading ramp(s) 61. The angle that a tailgate 10 rotates down from the conventional open position to fully open position in accordance with the present invention may be referred to as the tailgate decline angle 50. Accordingly, between the tailgate decline angle 50 and the reduced break-over angle 51, embodiments in accordance with the present invention may provide a more gradual transition from ground to bed floor 16.

Figure 25:
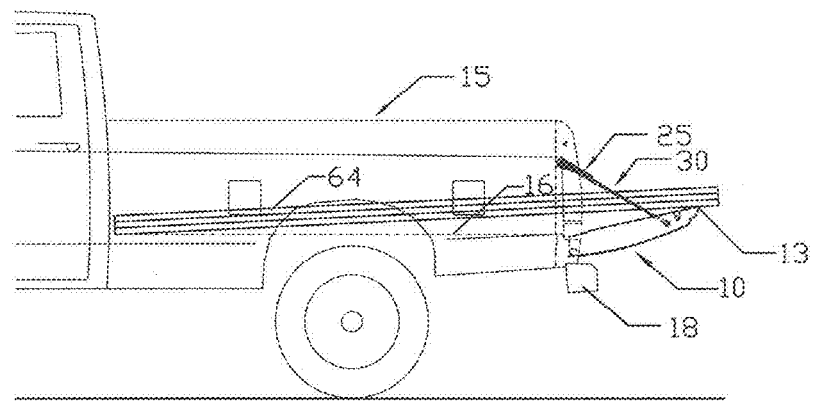
FIG. 25 is a schematic diagram illustrating a tailgate suspended, by a tailgate support in accordance with the present invention, above a conventional open position to better retain cargo extending longer than the bed of the pickup truck.
Figure 26:
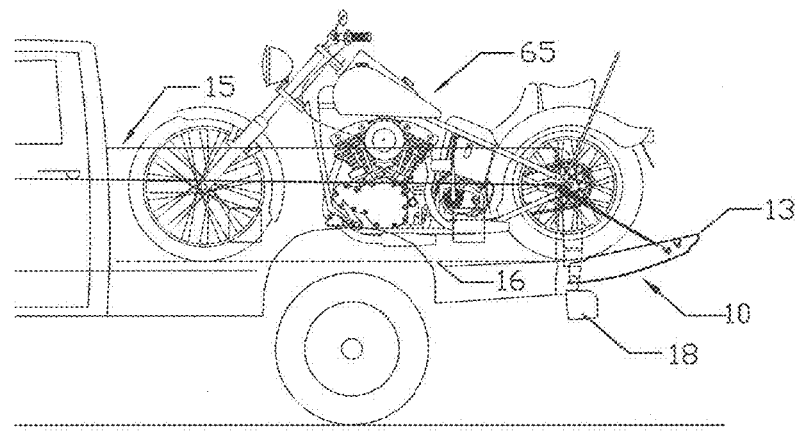
FIG. 26 is a schematic diagram illustrating a tailgate suspended, by a tailgate support in accordance with the present invention, above a conventional open position to better retain cargo extending longer than the bed of the pickup truck.

Referring to FIGS. 25 through 27, embodiments in accordance with the present invention allow the height of the leading edge 13 of the tailgate 10 to be easily adjusted between a convention open position located at ninety degrees of rotation from the closed position and an intermediate position located less than ninety degrees of rotation from the closed position. By supporting or suspending a tailgate 10 in an open position that is less than ninety degrees from the closed position, a tailgate support 30 in accordance with the present invention may resist rearward movement of cargo 64, 65 that is longer than the cargo area 15 of the corresponding vehicle. Additionally, a tailgate 10 with a higher leading edge 13 may facilitate transfer of items between a cargo area 15 and surfaces higher than the bed floor 16 (e.g., loading docks 66).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for positioning a tailgate of a vehicle, the method comprising:
  selecting a vehicle comprising
    a first side, second side, tailgate, and first tailgate support,
    the tailgate connected to pivot with respect to the first and second sides through a range of motion,
    the first tailgate support comprising a first end connected to the first side, a second end connected to the tailgate, and an adjustor located between the first and second ends,
    the first tailgate support, wherein the adjustor is selectively pivotable through a range of motion comprising at one end thereof a contracted position and at the other end thereof an expanded position,
    the first tailgate support, wherein the adjustor supports tensile loads in both the contracted position and the expanded position, and
    the first tailgate support having a tensioned length achieved by pulling the first and second ends away from one another; and
  pivoting the adjustor from the contracted position to the expanded position to transition the tensioned length from a first value to a second value, greater than the first value.

2. The method of claim 1, wherein the selecting comprises selecting the vehicle having the adjustor comprising a lever arm.

3. The method of claim 2, wherein pivoting the adjustor comprises actuating the lever arm.

4. The method of claim 3, wherein actuating the lever arm comprises toggling the lever arm from a first position to a second position.

5. The method of claim 4, wherein the selecting comprises selecting the vehicle having the adjustor with the contracted position comprising a cammed-over position.

6. The method of claim 1, wherein the selecting comprises selecting the vehicle having the adjustor with the contracted position comprising a cammed-over position.

7. The method of claim 1, further comprising maintaining, during the pivoting, the adjustor connected to the first and second ends of the first tailgate support.

8. The method of claim 1, further comprising maintaining the first end connected to the first side and the second end connected to the tailgate.

9. The method of claim 8, wherein the pivoting occurs during the maintaining.

10. The method of claim 1, wherein the selecting comprises selecting the vehicle having the tailgate with the range of motion comprising a first, closed position, a second, open position, and a third, open position, the second position being located about ninety degrees of rotation from the first position.

11. The method of claim 10, further comprising suspending, by the first tailgate support having the tensioned length equal to the second value, the tailgate in the second position.

12. The method of claim 10, further comprising suspending, by the first tailgate support having the tensioned length equal to the second value, the tailgate in the third position.

13. The method of claim 12, wherein the selecting comprises selecting the vehicle having the tailgate with the third position being located more than ninety degrees of rotation from the first position.

14. The method of claim 1, wherein the selecting comprises selecting the vehicle further comprising a second tailgate support having a first end connected to the second side, a second end connected to tailgate, and an adjustor located between the first and second ends thereof.

15. The method of claim 14, wherein the selecting comprises selecting the vehicle with the second tailgate support having a tensioned length achieved by pulling the first and second ends thereof away from one another.

16. The method of claim 15, wherein pivoting further comprises pivoting the adjustor of the second tailgate support to transition the tensioned length thereof from the first value to the second value.

17. The method of claim 1, further comprising unlocking, prior to the pivoting, the adjustor.

18. A method for positioning a tailgate of a vehicle, the method comprising:
   selecting a vehicle comprising
      a first side, second side, tailgate, and first tailgate support,
      the tailgate connected to pivot with respect to the first and second sides through a range of motion, and
      the first tailgate support comprising a first end connected to the first side and a second end connected to the tailgate;
   disconnecting the first tailgate support from the rest of the vehicle;
   procuring a second tailgate support comprising a first end, a second end, and an adjustor located between the first and second ends thereof, the second tailgate support having a tensioned length achieved by pulling the first and second ends thereof away from one another, the adjustor being selectively pivotable through a range of motion comprising at one end thereof a contracted position and at the other end thereof an expanded position;
   installing, after the disconnecting, the second tailgate support by connecting the first end thereof to the first side and connecting the second end thereof to the tailgate;
   supporting, by the second tailgate support with the adjustor in the contracted position, at least a portion of the weight of the tailgate;
   pivoting the adjustor from the contracted position to the expanded position to transition the tensioned length from a first value to a second value, greater than the first value; and
   supporting, by the second tailgate support with the adjustor in the expanded position, at least a portion of the weight of the tailgate.

19. A vehicle comprising:
   a first side;
   a second side;
   a tailgate having a weight and being connected to pivot with respect to the first and second sides through a range of motion;
   a tailgate support having a first end and a second end, the first end connected to the first side, the second end connected to tailgate;
   the tailgate support further having a tensioned length achieved by pulling the first and second ends away from one another;
   the tailgate support comprising an adjustor positioned between the first and second ends, the adjustor selectively transitioning the tensioned length between a first value and a second value, greater than the first value;
   the tailgate support, wherein the adjustor is selectively pivotable through a range of motion comprising at one end thereof a contracted position and at the other end thereof an expanded position; and
   the tailgate support, wherein the adjustor supports at least a portion of the weight of the tailgate in both the contracted position and the expanded position.

20. The vehicle of claim 19, wherein the contracted position comprises a cammed-over position.

* * * * *